J. Haynes,
Hand Saw.
No 25,015. Patented Aug. 9, 1859.
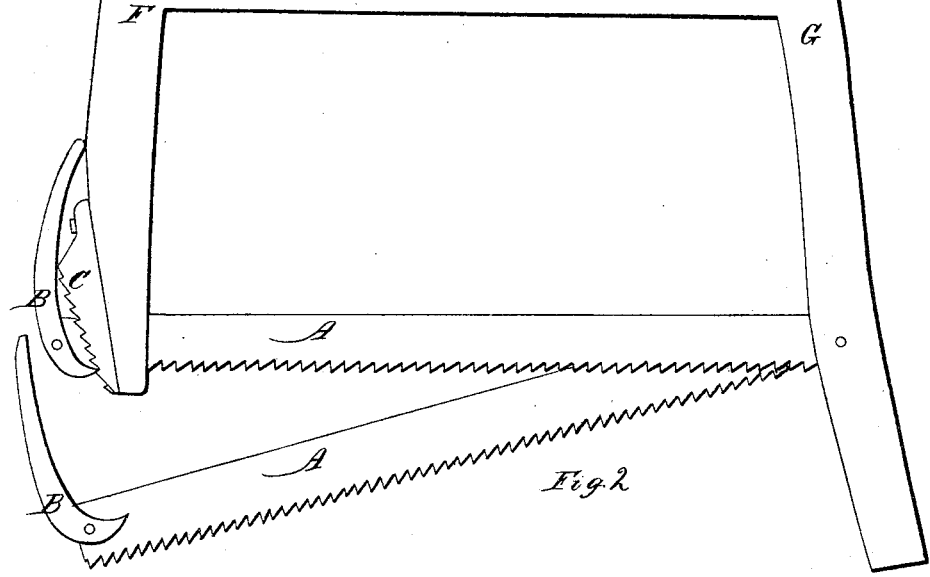
Witnesses
Will Allen
William Harmewill
Inventor
James Haynes

UNITED STATES PATENT OFFICE.

JAMES HAYNES, OF HOLLIS, MAINE.

WOOD-SAW FRAME.

Specification forming part of Letters Patent No. 25,015, dated August 9, 1859; Reissued August 25, 1863, No. 1,526.

*To all whom it may concern:*

Be it known that I, JAMES HAYNES, have invented a new and useful improvement on the wood-saw frame for stretching and holding the saw firm in its place when in use, called the "wood-saw stretcher or strainer;" and I do declare the following specification to be a full and exact description thereof, to wit:

1. The frame, in shape, is like the saw-frame in common use, for sawing wood. In the old fashioned frame, the strainer at the top-end of the frame was a wire, with a nut and a screw, or a twisted cord, the bar, in the middle of the frame, was framed into the two ends, or side pieces, on which the strain was based, in straining the saw, for use. In this improved construction, the middle piece is also framed into the ends, or side pieces, and the strain also comes upon that middle piece, in straining the saw, for use. But, at the upper end, instead of the twisted cord, or iron rod, with a screw, a bar is framed in solid near the top ends, to hold the top ends of the frame firm and steady, when the saw is either strained, or slack.

2. The strainer is attached to the lower end of the frame and saw blade, the saw being put into the frame, as in the old construction, by a mortise in the upper end piece of the frame and a slot in the lower end of the outer piece of the frame.

3. An inclined plain ratchet is fastened onto the outer edge of the lower piece of the frame, at the bottom end, having a slot, in it corresponding with the slot in the piece to which it is attached. This ratchet piece is thinner, at the lower end and grows considerably thicker, as it extends up so as to form the inclined plane of sufficient increase, in giving additional strain to the saw, as the setter or strainer is advanced up a notch in straining the saw. This inclined plane may be any necessary length required, in giving additional strain to the saw, say from two to four inches, more or less.

4. The lever part of the strainer has an oval shape bend, with a slot in the lower end into which the lower end of the saw is put and fastened with a rivet, so as to make an eccentric joint, with the hook end of the strainer, which, combined with the inclined plane, gives the strain of the saw increased by every additional notch upward. The lower end of this lever hooks in toward the frame, and catches into any notch necessary, in straining the saw.

5. The saw-blade is the same as any wood-saw, and so is the frame, with the alterations above described.

6. The above specifications are a full, clear and particular description of the said machine and my said improvement, and were necessary to a full and clear explanation thereof. But the part which I claim is as follows, to wit:

7. The parts, which I claim as my invention are—

The inclined plane ratchet and the nipper, or strainer, as applied to the saw and frame, as described above and represented in the drawing accompanying these specifications.

To the other parts I lay no claim, they being described only to give a clear, distinct and combined view and understanding of my said improvements. And the above claims are all, that I desire to secure, by Letters Patent.

JAMES HAYNES.

Witnesses:
 JOEL ALLEN,
 WILLIAM HUMEWILL.